(No Model.) 2 Sheets—Sheet 1.

J. THOMSON.
PROPORTIONAL WATER METER.

No. 476,099. Patented May 31, 1892.

WITNESSES:

INVENTOR:

(No Model.) 2 Sheets—Sheet 2.

J. THOMSON.
PROPORTIONAL WATER METER.

No. 476,099. Patented May 31, 1892.

WITNESSES:

INVENTOR:

UNITED STATES PATENT OFFICE.

JOHN THOMSON, OF BROOKLYN, NEW YORK.

PROPORTIONAL WATER-METER.

SPECIFICATION forming part of Letters Patent No. 476,099, dated May 31, 1892.

Application filed December 14, 1891. Serial No. 415,012. (No model.)

*To all whom it may concern:*

Be it known that I, JOHN THOMSON, a citizen of the United States, residing at Brooklyn, county of Kings, State of New York, have invented certain new and useful Improvements in Proportional Water-Meters, of which the following is a specification.

This is an invention in proportional water-meters.

Figure 1:
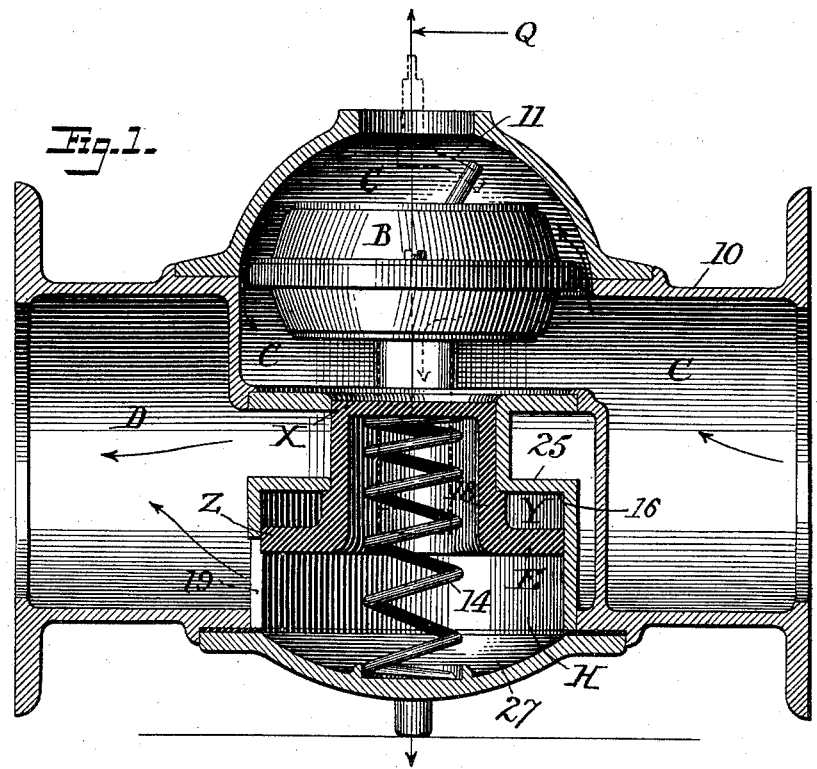
Figure 2:
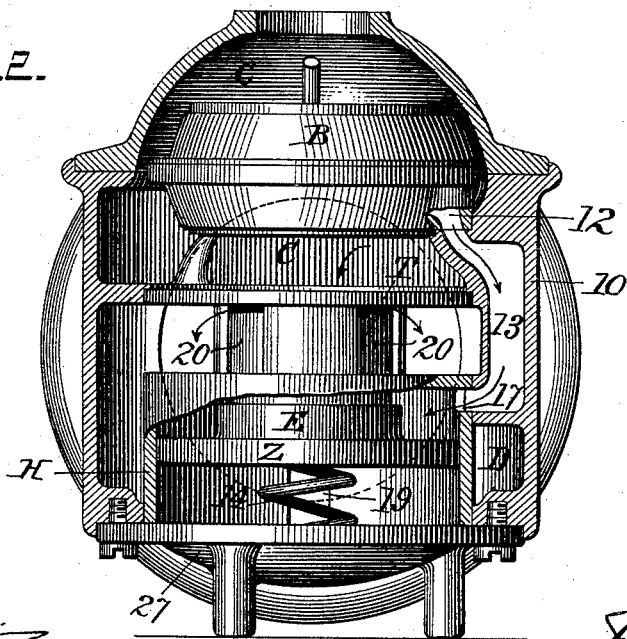
Figure 3:
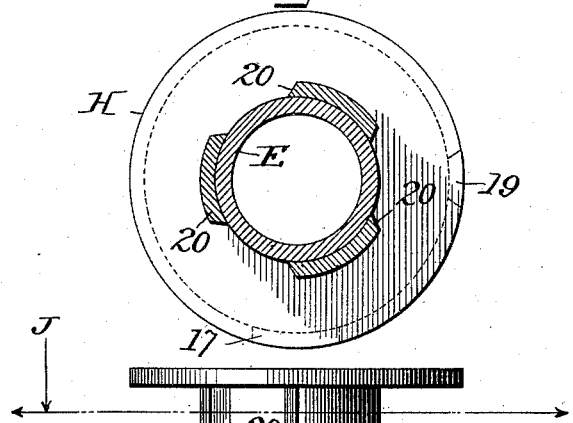
Figure 4:
Figure 6:
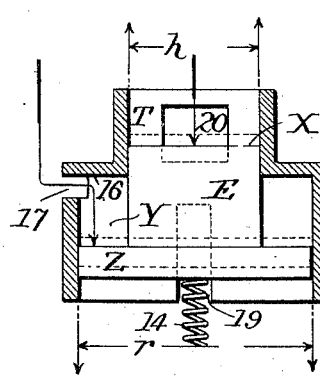
Figure 5:
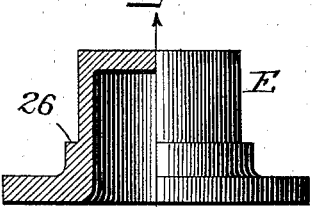
Figure 7:
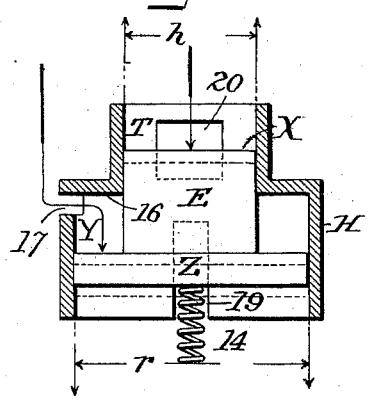
Figure 8:
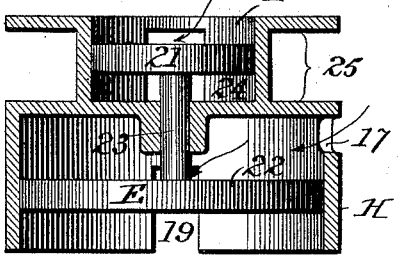

In the drawings, Figure 1 is a vertical center section, and Fig. 2 is a transverse section and elevation on line Q of apparatus arranged to carry out my invention. Fig. 3 is a top plan view and section on line J, and Fig. 4 is an elevation of the valve-casing. Fig. 5 is a half center section and elevation of the valve detached. Figs. 6 and 7 are diagrams to illustrate the operation of the device, and Fig. 8 shows a modification in the arrangement of the valve and its casing.

The principal objects of the invention are to insure practically exact registration of the total quantity discharged through the meter as a whole, regardless of changes in the friction of the measuring mechanism, and to simplify the construction over previous practice.

The measuring mechanism comprised in the casing B represents a positive meter of the oscillating-disk type—such, for instance, as illustrated in my patent of May 6, 1890, No. 427,485. It is situated within the main casing 10, and is to be suitably connected, as at 11 with an ordinary register. The inlet-port of the measuring-casing (not shown in the drawings) is open to the main inlet-chamber C, while the outlet-port 12 coincides with the cored water-way 13 in the main casing. The function of the measuring device is to record an aliquot part of the total flow. It is the means for causing the measuring mechanism to do this properly which is the subject of the present specification; and it consists of the simple differential plunger-valve E, its casing H, and the spring 14.

In Fig. 1 the valve is shown in its upper position, the ports being entirely closed, while in the remaining figures the valve is depressed, showing the ports partially opened. The smaller end X of the valve is presented to the direct flow from the main inlet-chamber C, while the circular chamber Y, formed by the larger end Z of the valve and the horizontal wall 16 of the valve-casing, is connected by the intermediate port 17 to the water-way 13, which latter leads to the discharge side of the measuring mechanism.

It is to be clearly borne in mind that the pressure area presented by the larger end surface of the valve within the chamber Y after deducting the area of the smaller end X is to be greater than that of the said smaller end. By counterboring the valve to form a recess 18 a desirable position is afforded for the spring. The function of the spring or its equivalent to act as a resilient resistance is by tending to force the valve upward to close the ports, to thereby produce an artificial resistance between the main inlet-chambers C and D, and the preferable form of helical spring for such purpose is one constructed to a "gain" pitch, as shown in Fig. 1. The advantage of this construction is that the resistance of the spring increases as the valve is thrust downward much more rapidly than in the instance of ordinary helical or volute springs coiled to a constant pitch, whence the spring may be of lighter tension at low flows and greater tension at fast flows. It will be obvious that the weight of the valve itself might be utilized to perform the duty of the spring by simply reversing the parts upside down. The flow from the larger valve-chamber Y is through the port 19, while the flow from the smaller valve-chamber T is through the ports 20, chamber Y discharging the smaller volume, that received from the measuring-casing, through the cored water-way 13, while chamber T discharges the larger volume received direct from the main inlet-chamber. The proportion of the respective series of valve-ports is such that the ratio of areas afforded by the ports from chambers Y and Z is constant at any position of the valve.

By referring in particular to Figs. 6 and 7 the operation of the device to sustain a proportional discharge from the valve-casing ports irrespective of frictional changes in the measuring mechanism will now be described. Assume such a resistance in the resilient resistance and such a fixed rate of draft from the meter that the valve will stand at the full-line position shown in Fig. 6. This position is the result of the excess of pressure between the valve-casing chambers Y and T and the main outlet-chamber D. If the total quantity being drawn from the pipe remained constant and the friction of the measuring mechanism also continued constant, the valve would stand stationary, as shown, and the proportional flow would properly continue; but the inconstant condition is in the friction of the measuring mechanism. This may require .05 pounds per square inch one minute and .5 or five pounds the next. Such changes may be caused by a floating particle of sand to be quickly ejected, or it may be slow, gradually increasing, and irremovable, due to wear of the parts. Let such a change be assumed—that is, a permanent increase of friction in the measuring mechanism. The consequences of this will be to subtract pressure from chamber Y in a measure directly proportionate to the increase of friction. This increase of friction will in like measure increase the pressure in the main chamber C and also upon the smaller area X of the valve; but as this area is less than that of the valve area within the chamber Y, and the detraction of pressure at Y not being transferred to an equal area at X, the result is that the spring is unloaded to the extent of the difference between the respective areas and the valve is instantly forced upward to close a portion of the ports, as shown in Fig. 7. If instead of an increase of friction we assume a decrease, then the increase of pressure in chamber Y due to the decrease of friction acting upon the greater area of the valve here presented will cause it to descend and open the ports. Thus any change in the friction of the measuring mechanism will cause the valve to rise or fall, even when the working-head and the diameter of the outlet remain constant, an increase of friction causing the valve to rise and throttle the ports, while a decrease of friction will result in forcing the valve downward to open the ports, and this is precisely the conditions required in that when the hydraulic condition is once established at any uniform rate of flow, it is the energy absorbed or given back by any change in the resistance of the measuring device which alone increases or decreases the total volume being discharged under any given head and area of outlet. It is believed that this, the controlling feature of the invention, cannot but be clearly understood by assuming, for present illustration, that the conditions of operation in the valve were reversed—that is, the main or inferred volume going to chamber Y and the measured volume to chamber T. In such case any increase of pressure in chamber C due to an increase of friction in the measuring device would act upon the greater area of the valve to still further depress it and open the ports, when the flow would be disproportionately increased through the ports from chamber Y, and the increased friction of the mechanism would not, as in the device described, be opposed by a correspondingly-increased resistance to the flow, but would be relieved by the increased area afforded for the escape of the fluid.

By giving literal dimensions to the valve, as shown, the action may be demonstrated by simple arithmetical process. Thus, if $h$ equals area of one inch and $r$ equals area of three inches, then 3 minus 1 equals two inches, the end area of the valve in chamber Y. Then if the friction in the measuring mechanism should increase so as to reduce the pressure in chamber Y, say, 0.5 pounds to each square inch of its end surface, this would prevent from reaching chamber Y $2. \times .5 = 1.0$ pound, but would correspondingly add to chamber T $1. \times .5 = 0.5$ pound. Hence, as $1. - .5 = .5$ pound, this represents the extent to which the spring would be unloaded, when the valve would be instantly moved upward until the throttling of the ports would again establish a proper relation adapted to the increased resistance of the mechanism.

In Fig. 8 I have shown how the conditions of operation herein described may be obtained by the use of a compound piston-valve, in which the piston 21 22 would be connected by a spindle 23, passing through a septum 24 in the valve-casing. While this arrangement would be somewhat more economical of space, it is more difficult to manufacture than the simple plunger-valve selected to illustrate the invention.

In the design of the valve-casing an advantage is derived from locating the main ports of chamber T to discharge into the circular space 25, as this channel may be readily machined to present a smoother and more uniform receiving-space than if formed by coring the main casing and inserting a valve-casing such as indicated in Figs. 6 and 7.

The step or shoulder 26 of the valve is to limit its upward movement, while its downward position is determined by the inclosing cap 27.

What I claim is—

1. The combination of the differential valve, valve-casing, ports, and resilient resistance with the main casing and the measuring device, the arrangement and construction being such that the measured volume passes to the larger area of the valve, while the unmeasured or inferred volume passes to the smaller area thereof, substantially as described.

2. In a proportional water-meter, the combination, with the valve-casing having two series of ports and the resilient resistance, of the differential plunger-valve operating in said casing and provided with end-pressure surfaces of unequal areas, the greater area connected to the discharge from the measuring device.

In testimony whereof I have signed my name to this specification in the presence of two subscribing witnesses.

JOHN THOMSON.

Witnesses:
J. F. COFFIN,
HERMANN PRILLWITZ.